US007520547B2

(12) United States Patent
Cornelissen

(10) Patent No.: US 7,520,547 B2
(45) Date of Patent: *Apr. 21, 2009

(54) GRIPPING DEVICE FOR USE ON A PAINT RECEPTACLE, IN PARTICULAR A TIN OF PAINT

(76) Inventor: Rudolphus Johannes Adrianus Maria Cornelissen, Wieken 43, 5374 JT Schaijk (NL)

( * ) Notice: Subject to any disclaimer, the term of this patent is extended or adjusted under 35 U.S.C. 154(b) by 165 days.

This patent is subject to a terminal disclaimer.

(21) Appl. No.: 11/595,678

(22) Filed: Nov. 10, 2006

(65) Prior Publication Data

US 2007/0114807 A1 May 24, 2007

(30) Foreign Application Priority Data

| | | |
|---|---|---|
| May 11, 2004 | (NL) | 1026161 |
| Jun. 8, 2004 | (NL) | 1026353 |
| Sep. 3, 2004 | (NL) | 1026965 |
| May 11, 2005 | (NL) | PCT/NL2005/000359 |

(51) Int. Cl.
*A47J 45/00* (2006.01)

(52) U.S. Cl. ..................... 294/27.1; 294/34; 15/257.05; 15/257.06; 248/213.2; 220/759

(58) Field of Classification Search ................ 294/27.1, 294/31.2, 32, 33, 34, 31.1; 248/110, 210, 248/310, 213.2; D32/53.1; 16/110.1, 406; 220/570, 737, 755, 756, 759, 762; 15/257.05, 15/257.06
See application file for complete search history.

(56) References Cited

U.S. PATENT DOCUMENTS

| | | | | |
|---|---|---|---|---|
| 912,472 | A * | 2/1909 | Hart | 294/33 |
| 1,716,849 | A * | 6/1929 | Culp | 294/32 |
| 2,628,858 | A * | 2/1953 | Doty | 294/33 |
| 4,023,702 | A * | 5/1977 | McKnight | 294/27.1 |
| 6,431,392 | B1 * | 8/2002 | Eisenbeisz | D32/53.1 |
| 2008/0040881 | A1 * | 2/2008 | Maria cornelissen | 15/257.06 |

* cited by examiner

*Primary Examiner*—Paul T Chin
(74) *Attorney, Agent, or Firm*—Eric Karich

(57) ABSTRACT

A gripping device for use on a paint tin has a U-shaped grip with a middle section and two flexible arms. Free outer ends of the flexible arms are provided with hook-shaped parts which are used to couple to a paint tin. Within the grip is a U-shaped handle, free outer ends of which are provided with sleeves that can slide along the anus of the grip. There are stops on the arms of the grip which limit sliding of the free outer ends of the handle in a direction towards the middle section of the grip. By pulling the middle section of the handle towards the middle section of the grip, the arms bend as a result of which the free outer ends of the arms come towards each other.

4 Claims, 4 Drawing Sheets

GRIPPING DEVICE FOR USE ON A PAINT RECEPTACLE, IN PARTICULAR A TIN OF PAINT

This application for a utility patent is a continuation-in-part of a previously filed Netherlands Application Number 1026161, filed May 11, 2004, Netherlands Application number 1026353, filed Jun. 8, 2004, Netherlands Application number 1026965, filed Sep. 3, 2004, and PCT application number PCT/NL2005/000359, filed May 11, 2005 (Publication number WO 2005/108221 A2).

BACKGROUND OF THE INVENTION

1. Field of the Invention

The invention relates to a gripping device for use on a paint receptacle, in particular a tin of paint, comprising a U-shaped grip with a middle section that functions as a handgrip and two arms that are connected to it, the free outer ends of which are provided with a means of coupling for coupling to a paint receptacle in such a way that it is detachable, where at least the free outer ends of the arms can move with respect to the middle section. By U-shaped is meant any shape having two arms and a middle section in between them, where each of the arms has a free outer end.

2. Prior Art

Such a gripping device is known from the American patent U.S. Pat. No. 2,628,858. The coupling elements of this known gripping device are two hooks on the free outer ends of the grip, which can be hooked under the inward protruding rim of a tin of paint and two locking elements that can slide along the grip's arms which can be slid in front of the hooks' openings in order to close off the rim of the paint tin. The grip of the known gripping device is flexible as a result of which the free outer ends of the grip's arms can be bent towards each other in order to be able to get the hooks under the rim of a paint tin. The disadvantage of this known gripping device is that in order to fit it on a paint tin two hands are usually necessary to push the free outer ends of the grip's arms towards each other and in any case, it is difficult to fit the gripping device on a paint tin with one hand.

SUMMARY OF THE INVENTION

An objective of the invention is to provide a gripping device of the type described in the preamble, that can be fitted on a paint receptacle more easily. To this end, the gripping device is characterized in that it comprises a means of moving in order to move the free outer ends of the arms in a direction towards each other. Because of this, it is not necessary to grasp the free outer ends of the arms and push them towards each other, for which two hands are usually needed, but the free outer ends of the grip's arms can simply be brought towards each other with the help of the means of moving.

An embodiment of the handle according to the invention is characterized in that the means of moving is a U-shaped handle with a middle section and two legs that are connected to it, which handle is situated between the grip's arms, in which the handle's middle section is situated near the grip's middle section, and in which the free outer ends of the handle's legs are coupled to the grip's arms. The handle's middle section is here situated at a distance from the grip's middle section. By pulling the middle section of the handle towards the middle section of the grip, which can easily be done with one hand, the free outer ends of the grip's arms are pulled towards each other and the free outer ends can be brought into the opening of a tin of paint. In case the grip is made of a flexible elastic material, the grip will bend back because of its elasticity as soon as the handle is released, as a result of which the means of coupling will couple to the paint tin's rim. In case the grip is not flexible (for example, the arms are connected to the middle section by means of hinges) the middle section of the handle will have to be pushed back in order to bring the free outer ends of the grip's arms away from each other again.

A further embodiment of the handle according to the invention is characterized in that the free outer ends of the handle's legs are attached to the grip's arms.

Another embodiment of the handle according to the invention is characterized in that the free outer ends of the handle's legs can slide along the grip's arms, and the grip's arms are provided with stops that limit sliding of the free outer ends of the handle's legs in a direction towards the middle section of the grip.

The grip's arms can be connected to the middle section in such a way that they can hinge, however, it is preferable for the grip to be made from one piece and that the material is elastic. The handle's legs can also be connected to the middle section so that they can hinge, however, it is preferable for the handle to be made from one whole piece and from an elastic material.

Still a further embodiment of the handle according to the invention is characterized in that each free end of the grip's arms is provided with a hook-shaped part that is a part of the means of coupling, in which the opening of the hook is turned outwards. Because of this, the hook-shaped part can be hooked under the paint tin's rim which projects inwards. By a hook-shaped part is meant each part that is provided with an opening in which a part of a paint receptacle's rim can be received.

In order to be able to fit the gripping device firmly on paint tins having rims of varying thicknesses, each free end of the grip's arms in addition to the hook-shaped part may be provided with an additional hook-shaped part of a different size than the hook-shaped part mentioned above.

Again a further embodiment of the handle according to the invention is characterized in that the gripping device, furthermore, comprises two locking elements which can be brought in front of the openings of the hook-shaped parts. Due to the locking elements it is possible to prevent the rim of the paint receptacle from unintentionally coming loose from the hook's opening and, therefore, from the gripping device as well. The locking elements are preferably two locking strips that can slide along the grip's arms.

In case the free outer ends of the handle's legs can slide along the grip's arms, the locking elements are preferably attached to the free outer ends of the handle's legs, so that by moving the handle both locking elements will slide.

Furthermore, the locking elements on the side turned toward the grip are preferably provided with an opening for receiving an outward projecting rim on the periphery at the top of the tin of paint when the gripping device is being fitted on a paint tin. Because of this, the locking elements are clicked into the locked position on the rim of the tin and more force is needed to pull the locking elements up into the unlocked position. The risk that here the locking elements will unintentionally slide into the unlocked position is greatly reduced because of this.

BRIEF DESCRIPTION OF THE DRAWINGS

The invention will be elucidated more fully below on the basis of drawings in which embodiments of the gripping device according to the invention are shown. In these drawings.

DETAILED DESCRIPTION OF THE DRAWINGS

Figure 1:
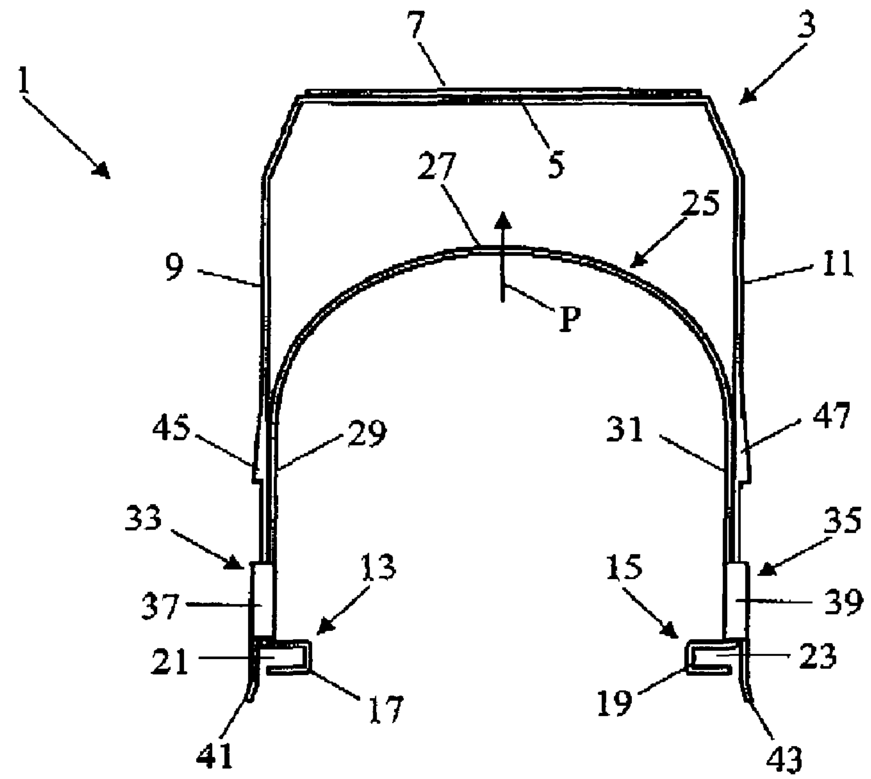
FIG. 1 shows a side-view of a first embodiment of the gripping device according to the invention with the handle in a first position.
Figure 2:
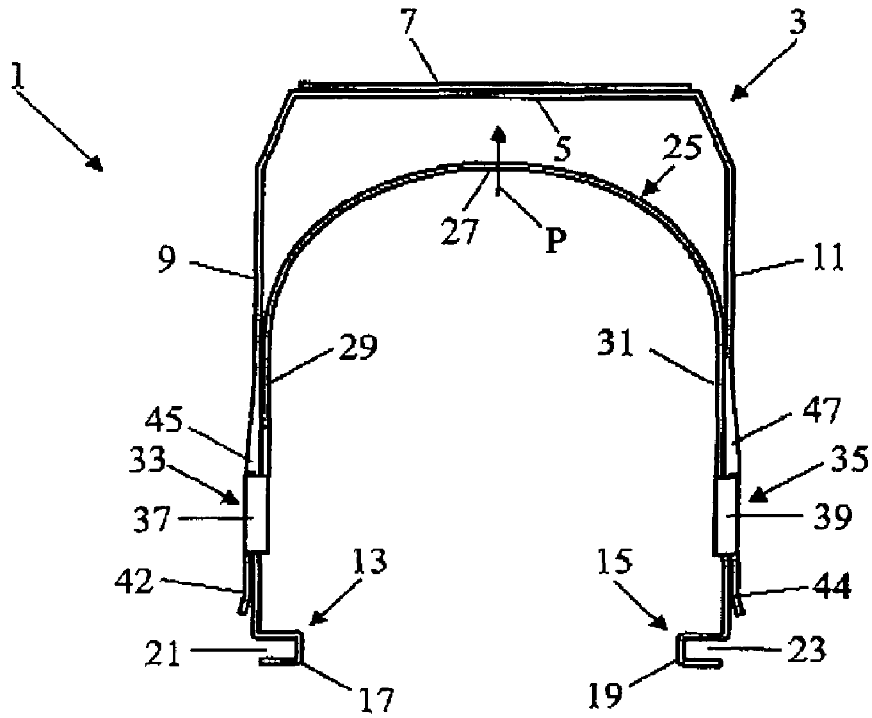
FIG. 2 shows a side-view of the gripping device with the handle in a second position.
Figure 3:
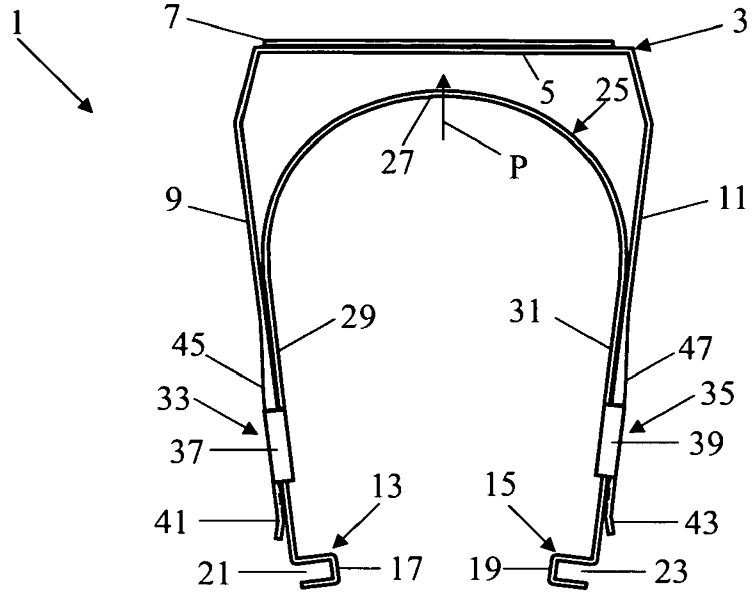
FIG. 3 shows a side-view of the gripping device with the free outer ends of the grip's arms pulled towards each other.

In FIGS. 1, 2 and 3, a first embodiment of the gripping device according to the invention is shown in a side-view with the handle in different positions. The gripping device 1 has a U-shaped grip 3 made out of one piece of an elastic material, for example plastic, with a middle section 5 that is provided with a handgrip 7 and two flexible arms 9, 11. The free outer ends 13, 15 of the arms 9, 11 are made as hook-shaped parts 17, 19 with the openings 21, 23 turned outwards and which are a means of coupling for coupling to a paint tin in such a way that it is detachable.

Furthermore, the gripping device 1 has a means of moving with which the arms can be moved in a direction towards each other. This means of moving is made up of a U-shaped handle 25 with a middle section 27 and two legs 29, 31 which are connected to it. This handle 25 is situated between the arms of the grip 3, where the handle's middle section 27 is situated at a distance from, but is near the grip's middle section 5. The free outer ends 33, 35 of the handle's legs are provided with sleeves 37, 39 which are situated on the arms 9, 11 of the grip 3 and can be slid along those arms. There are strips situated on the free outer ends 33, 35 of the legs, which are locking elements 41, 43 and can be slid in front of the openings 21, 23 of the hook-shaped parts, see FIG. 1.

The arms 9, 11 of the grip 3 are provided with stops 45, 47 which limit sliding of the free outer ends 33, 35 of the handle's legs in a direction P towards the middle section 5 of the grip, see FIG. 2. By pulling the middle section 27 of the handle 25 from this position towards the middle section 5 of the grip 3, the arms 9, 11 bend as a result of which the free outer ends 13, 15 of the arms come towards each other, see FIG. 3.

Figure 4:
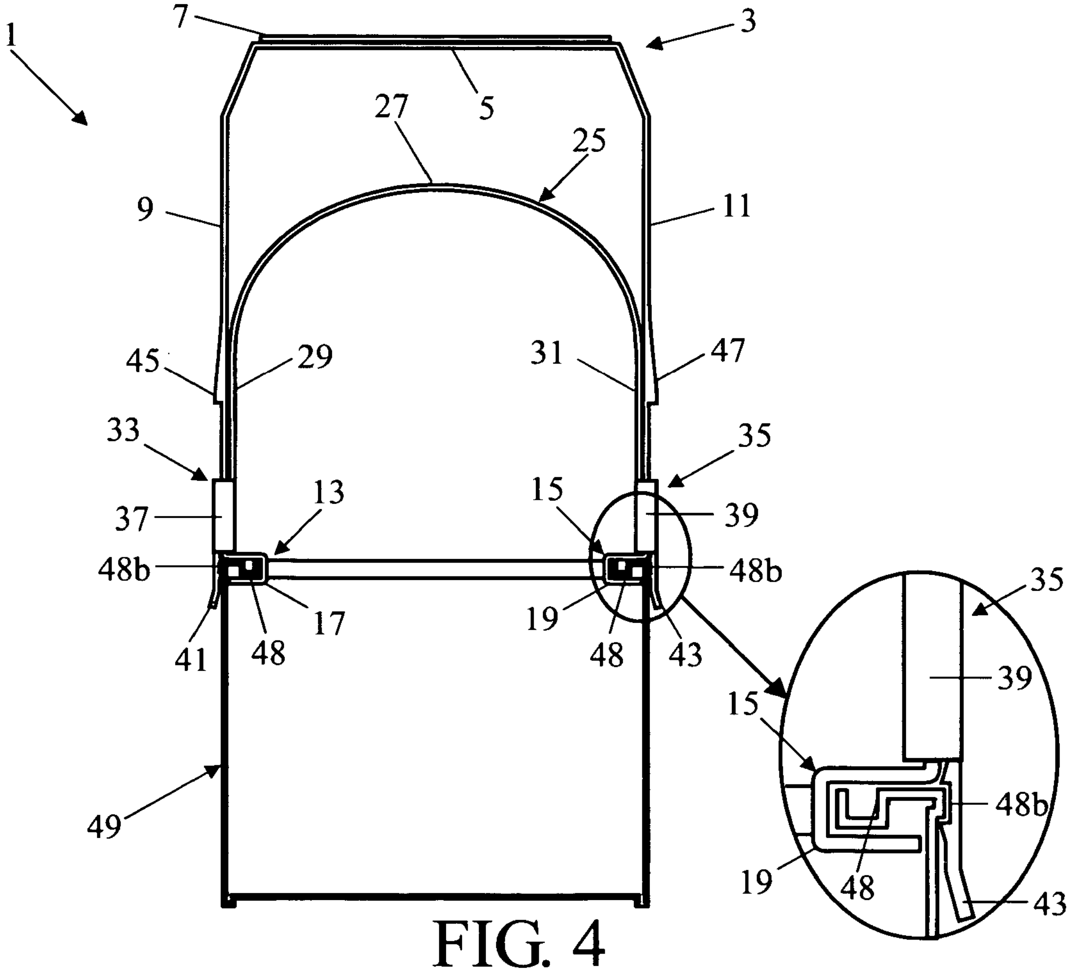
FIG. 4 shows the gripping device fitted on a tin of paint.

In FIG. 4, the gripping device 1 is shown once again but now on a paint tin 49. The hook-shaped parts 17, 19 are situated here about the rim 48 of a paint tin 49, which rim projects inwards, and the locking elements 41, 43 are situated on the exterior side of the paint tin 49 and close off the rim 48.

The locking elements 41, 43 on the side turned toward the grip 3 preferably are provided with an opening 42, 44 (see FIGS. 1-3 also) for receiving an outward projecting rim 48*b* on the periphery at the top of the tin of paint when the gripping device 1 fitted on the paint tin. Because of this, the locking elements are clicked in the locked position on the rim 48*b* of the tin and more force is needed to pull the locking elements up into the unlocked position.

Figure 5:
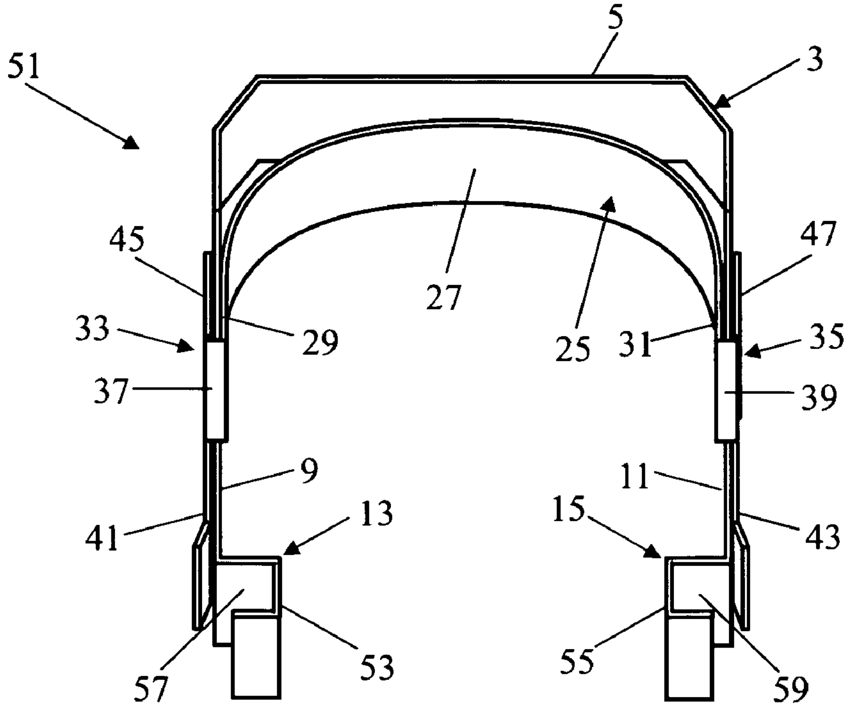
FIG. 5 shows a perspective view of a second embodiment of the gripping device provided with larger hooks.

In FIG. 5, a second embodiment of the gripping device 51 according to the invention is shown in perspective. All parts of this gripping device 51 that are the same as those in the drawings of the gripping device 1 shown in figures 1-4, are indicated by the same reference number. This gripping device 51 is provided with hooks 53, 55 with a larger opening 57, 59 for use on paint tins with a thicker rim.

Figure 6:
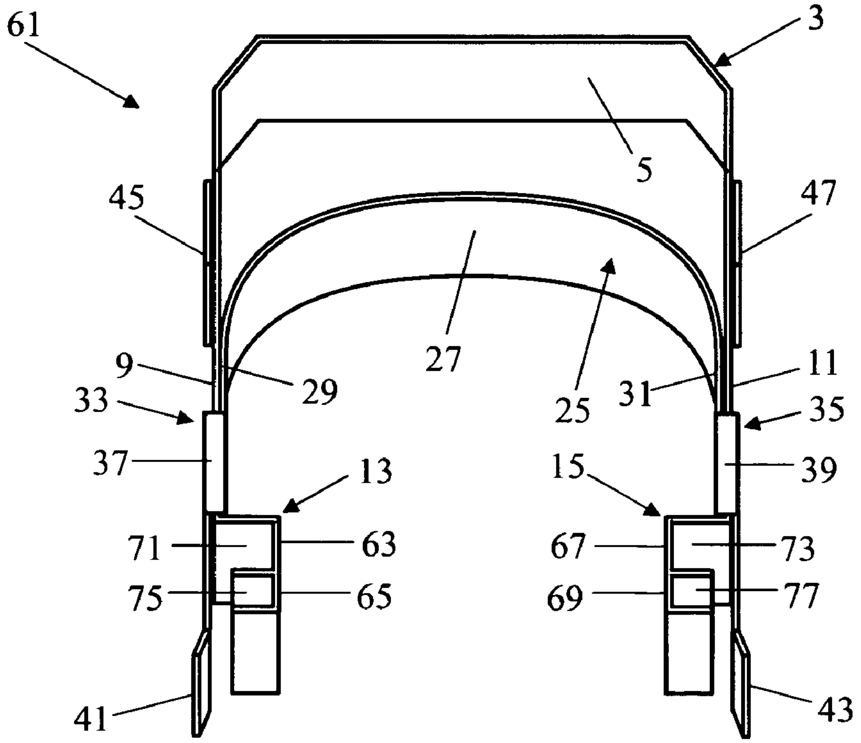
FIG. 6 shows a perspective view of a third embodiment of the gripping device provided with double hooks.

In order to fit well on paint tins with a thin as well as those with a thick rim, a third embodiment of the gripping device 61 is shown in FIG. 6, provided with double hooks 63, 65 and 67, 69 with a small and a large opening 71, 75 and 73, 77 respectively. All parts of this gripping device 61 that are the same as those in the drawings of the gripping device 1 shown in FIGS. 1-4, are indicated by the same reference number.

Figure 7:
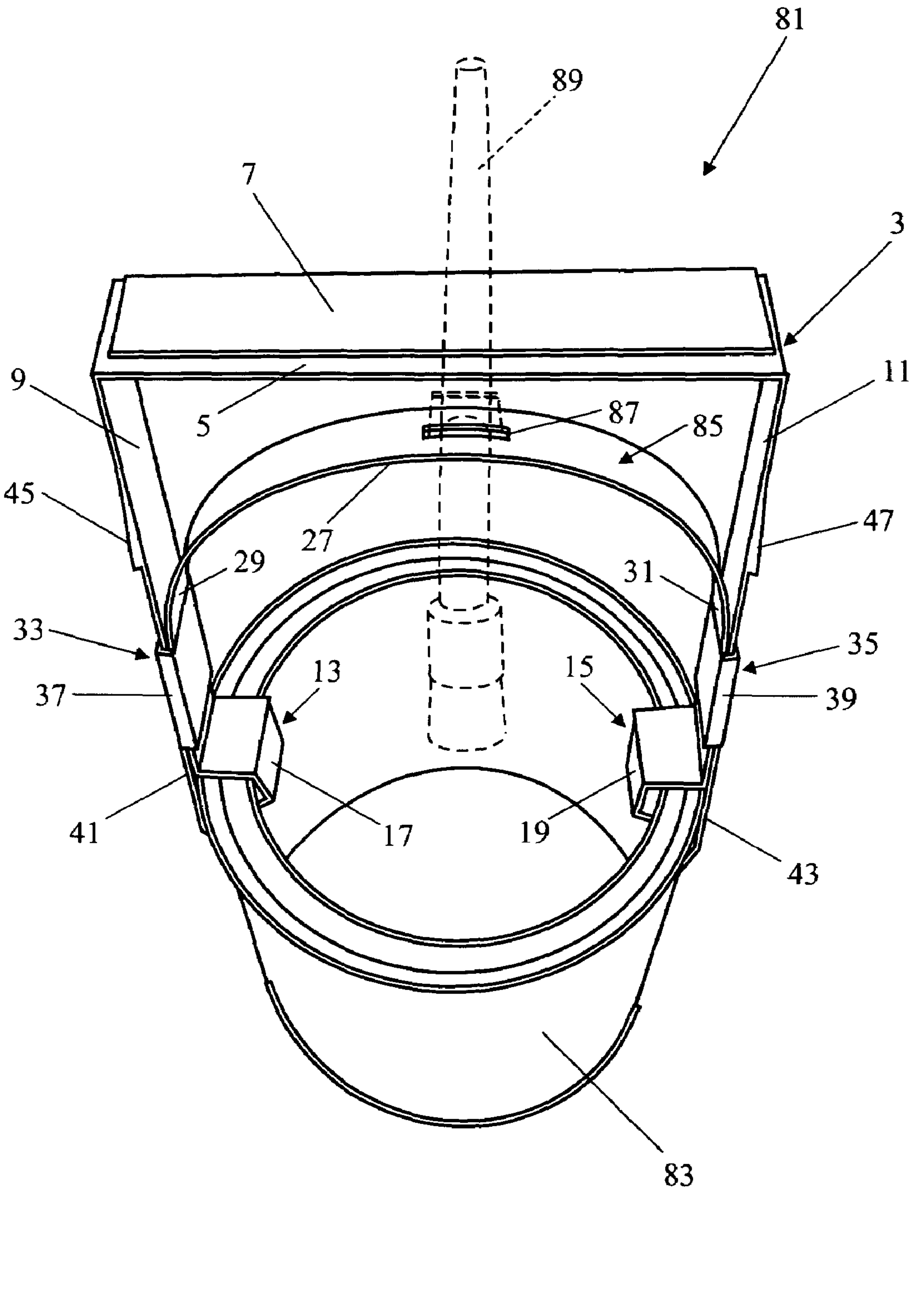
FIG. 7 shows a perspective view of a fourth embodiment of the gripping device situated on a paint tin.

Finally, in FIG. 7 a fourth embodiment of the gripping device 81 is shown in perspective on a paint tin 83. Here as well, all parts of this gripping device 81 that are the same as those in the drawings of the gripping device 1 shown in FIGS. 1-4, are indicated by the same reference number. The handle 85 of this gripping device 81 is provided with an opening 87 in the middle of which a brush 89 can be hung.

Although in the above the invention is explained on the basis of the drawings, it should be noted that the invention is in no way limited to the embodiments shown in the drawings. The invention also extends to all embodiments deviating from the embodiments shown in the drawings within the context defined by the claims. Thus the free outer ends of the handle's legs may also be attached to the grip's arms instead of sliding along the arms and the locking elements may be separate from the handle or even, if necessary, omitted.

What is claimed is:

1. Gripping device for use on a paint receptacle, comprising:

a U-shaped grip with a middle section that functions as a handgrip;

two arms that are connected to the U-shaped grip, free outer ends of the arms are provided with a means of coupling in order to couple to a paint receptacle;

a means of moving the free outer ends in a direction towards each other, wherein the means for moving includes a U-shaped handle with a middle section and two legs that are connected to the middle section, the U-shaped handle being situated between the arms of the U-shaped grip, in which the middle section of the U-shaped handle is situated near the middle section of the U-shaved grip, and where free outer ends of the legs of the handle are coupled to the grip's arms of the U-shaped grip;

the free outer ends of the legs of the U-shaped handle are attached to the arms of the U-shaped grip such that the free outer ends of the legs of the U-shaped handle can slide along the arms of the U-shaped grip, and the arms of the U-shaped grip are provided with stops that limit sliding of the free outer ends of the legs of the U-shaped handle in a direction towards the middle section of the U-shaped grip;

a hook-shaped part formed at each of the free outer ends of the arms of the U-shaped grip that is a part of the means of coupling, in which the hook-shaped part includes an opening that is turned outwards; and characterized in that the gripping device further comprises two locking elements which can be brought in front of the openings of the hook-shaped parts.

2. Gripping device according to claim 1, characterized in that the locking elements are attached to the free outer ends of the legs of the U-shaped handle.

3. Gripping device according to claim 1, characterized in that the locking elements are locking strips that can slide along the arms of the U-shaped grip.

4. Gripping device according to claim 1, characterized in that the locking elements are provided with an opening for receiving an outward projecting rim of the paint receptacle.

* * * * *